United States Patent
Igarashi et al.

(10) Patent No.: US 10,400,889 B2
(45) Date of Patent: Sep. 3, 2019

(54) ABNORMALITY DETECTION DEVICE FOR HYDRAULIC CIRCUIT AND ABNORMALITY DETECTION METHOD FOR HYDRAULIC CIRCUIT

(71) Applicant: FUJI JUKOGYO KABUSHIKI KAISHA, Tokyo (JP)

(72) Inventors: Masato Igarashi, Tokyo (JP); Sho Yoshida, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 328 days.

(21) Appl. No.: 15/367,374

(22) Filed: Dec. 2, 2016

(65) Prior Publication Data

US 2017/0167603 A1 Jun. 15, 2017

(30) Foreign Application Priority Data

Dec. 10, 2015 (JP) .................................. 2015-241543

(51) Int. Cl.
*F16H 61/12* (2010.01)
*F15B 1/04* (2006.01)
(Continued)

(52) U.S. Cl.
CPC ............ *F16H 61/12* (2013.01); *E02F 9/2079* (2013.01); *E02F 9/226* (2013.01); *E02F 9/267* (2013.01);
(Continued)

(58) Field of Classification Search
CPC ............ F16H 61/12; F16H 2061/1228; F16H 2061/1264; F15B 1/04; F15B 11/08; F15B 13/0416; F15B 15/20; F15B 2211/50
See application file for complete search history.

(56) References Cited

U.S. PATENT DOCUMENTS 4,393,732 A 7/1983 Suzuki et al.
4,967,621 A 11/1990 Soga et al.
(Continued)

FOREIGN PATENT DOCUMENTS

JP 2010-242530 A 10/2010
JP 2013-096540 A 5/2013
JP 2014-234909 12/2014

*Primary Examiner* — Huan Le
(74) *Attorney, Agent, or Firm* — Smith, Gambrell & Russell, LLP

(57) ABSTRACT

Abnormality detection device for a hydraulic circuit with oil pump capable of increasing pressure of oil sucked through a suction port and discharging the oil through discharge ports; a switching unit switching between fully and partially discharged states; a pressure regulation unit regulating oil pressure; and a hydraulic pressure detection unit that detects the oil pressure includes: a storage unit that stores a maximum discharge pressure in the partially discharged state; a switching control unit that switches to either one of the discharged states; a pressure regulation control unit that sets a target pressure higher than the maximum discharge pressure in the partially discharged state, and performs pressure regulation control to achieve the target pressure; and a determination unit that determines whether the switching unit has a fixation abnormality in one of the discharged states by comparing hydraulic pressure with maximum discharge pressure in the partially discharged state.

20 Claims, 4 Drawing Sheets

(51) Int. Cl.
*F15B 11/08* (2006.01)
*F15B 13/04* (2006.01)
*F15B 15/20* (2006.01)
*F15B 20/00* (2006.01)
*F16H 61/662* (2006.01)
*E02F 9/20* (2006.01)
*E02F 9/22* (2006.01)
*E02F 9/26* (2006.01)

(52) U.S. Cl.
CPC ............... *F15B 1/04* (2013.01); *F15B 11/08* (2013.01); *F15B 13/0416* (2013.01); *F15B 15/20* (2013.01); *F15B 20/004* (2013.01); *F16H 61/662* (2013.01); *F15B 2211/50* (2013.01); *F16H 2061/1208* (2013.01); *F16H 2061/1264* (2013.01)

(56) References Cited

U.S. PATENT DOCUMENTS

| | | | |
|---|---|---|---|
| 5,743,089 A * | 4/1998 | Tohji | E02F 9/2235 60/450 |
| 5,819,194 A | 10/1998 | Hara et al. | |
| 9,002,619 B2 | 4/2015 | Ito et al. | |
| 2002/0162457 A1 | 11/2002 | Hyodo et al. | |
| 2005/0011742 A1 | 1/2005 | Yamamoto | |
| 2011/0203682 A1* | 8/2011 | Ishikawa | F16H 61/12 137/487.5 |
| 2013/0224044 A1 | 8/2013 | Maruoka et al. | |
| 2014/0318411 A1 | 10/2014 | Ogawa | |
| 2016/0017990 A1* | 1/2016 | Yoshimura | F16H 61/12 701/62 |
| 2016/0312442 A1 | 10/2016 | Egawa et al. | |
| 2016/0312443 A1 | 10/2016 | Egawa et al. | |
| 2017/0248225 A1 | 8/2017 | Igarashi et al. | |

* cited by examiner

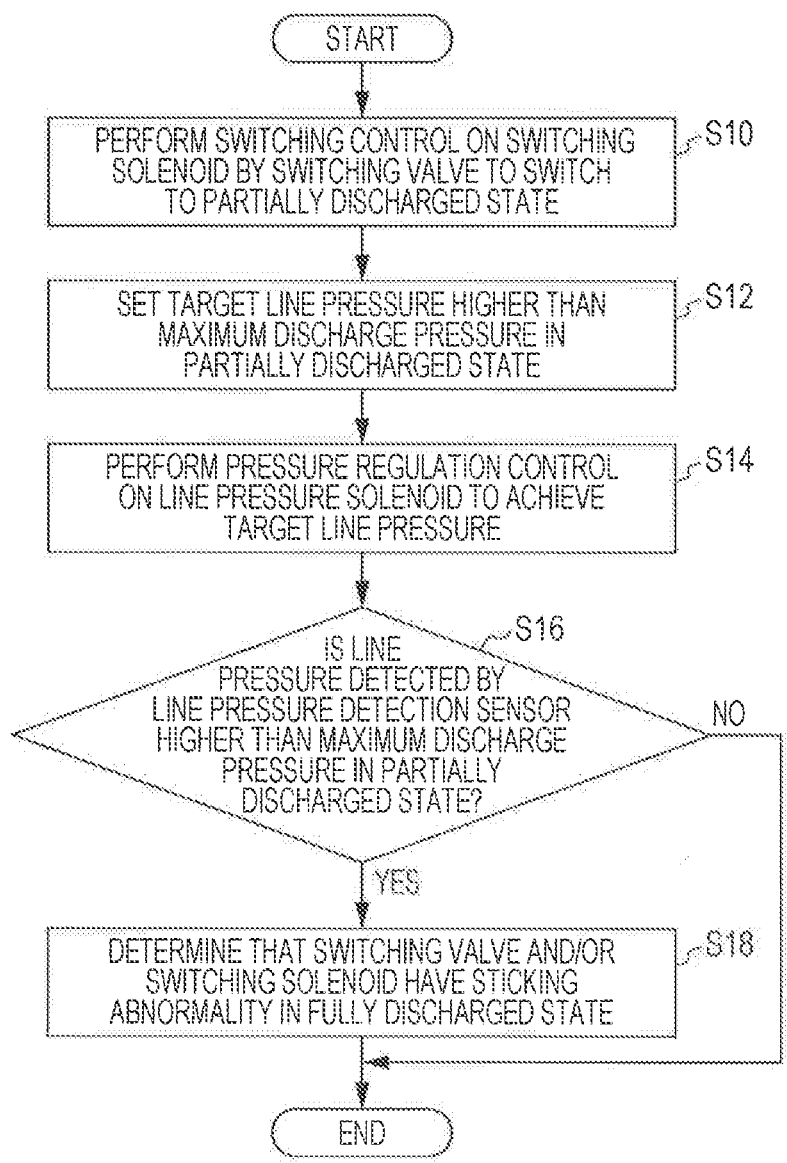

ABNORMALITY DETECTION DEVICE FOR HYDRAULIC CIRCUIT AND ABNORMALITY DETECTION METHOD FOR HYDRAULIC CIRCUIT

CROSS-REFERENCE TO RELATED APPLICATIONS

The present application claims priority from Japanese Patent Application No. 2015-241543 filed on Dec. 10, 2015, the entire contents of which are hereby incorporated by reference.

BACKGROUND

1. Technical Field

The present invention relates to an abnormality detection device for a hydraulic circuit and an abnormality detecting method for a hydraulic circuit.

2. Related Art

In a hydraulic circuit for an automatic transmission (for instance, a continuously variable transmission (CVT)) of a vehicle, the pressure of the oil, discharged from pump driven by the power of an engine, is regulated and the oil with the regulated pressure is supplied. Nowadays, reduction of the load of oil pumps is demanded because of necessity for improvement in the fuel efficiency of vehicles. As a technique of reducing the load of an oil pump, there is a technique which switches between a fully discharged state where oil is discharged through two discharge ports of the oil pump and a partially discharged state where oil is discharged through one of the two discharge ports. As discharged-state switching units, for instance, a spool valve and a solenoid valve to move the spool valve are used.

However, in the case where a switching unit is fixed in a fully discharged state and is not switchable to a partially discharged state, the load of the oil pump increases and the engine power is consumed more than necessary. In order to detect the fixation for instance, Japanese Unexamined Patent Application Publication (JP-A) No. 2014-234909 discloses a fixation determination device for a fluid pressure pump that is switchable between a fully discharged state and a partially discharged state by operating a switching valve with an electromagnetic valve. When the fluid pressure pump is switched to a partially discharged state, in the case where the difference between a fluid pressure (detected value) and a specified value of fluid pressure is greater than or equal to a predetermined value, the fixation determination device determines that at least one of the electromagnetic valve or the switching valve is fixed in a fully discharged state.

The fixation determination in JP-A No. 2014-234909 makes determination in the case where the condition that the number of engine revolutions is greater than or equal to a predetermined number is met. It is preferable to detect a fixation of a switching unit by a simple method without setting a predetermined condition on the number of engine revolutions.

SUMMARY OF THE INVENTION

It is desirable to provide an abnormality detection device for a hydraulic circuit and an abnormality detection method for a hydraulic circuit that are capable of detecting a fixation of a switching unit that switches between a fully discharged state and a partially discharged state of an oil pump by a simple method.

An aspect of the present invention provides an abnormality detection device for a hydraulic circuit including an oil pump capable of increasing a pressure of oil sucked through a suction port and discharging the oil through discharge ports; a switching unit that switches between a fully discharged state where oil is discharged to an oil passage through all the discharge ports and a partially discharged state where oil is discharged to the oil passage through part of the discharge ports; a pressure regulation unit that regulates a pressure of oil discharged in either one of the discharged states, switched by the switching unit; and a hydraulic pressure detection unit that detects a hydraulic pressure regulated by the pressure regulation unit. The abnormality detection device includes: a storage unit that stores a maximum discharge pressure of oil that is allowed to be discharged in the partially discharged state; a switching control unit that performs switching control to switch to either one of the fully discharged state and the partially discharged state by the switching unit; a pressure regulation control unit that, after the switching control performed by the switching control unit, sets a target hydraulic pressure to a hydraulic pressure higher than the maximum discharge pressure in the partially discharged state stored in the storage unit, and performs pressure regulation control on the pressure regulation unit to achieve the target hydraulic pressure; and a determination unit that, after the pressure regulation control performed by the pressure regulation control unit, determines whether the switching unit has a fixation abnormality in the fully discharged state or the partially discharged state by comparing the oil pressure detected by the hydraulic pressure detection unit with the maximum discharge pressure in the partially discharged state.

The storage unit may store a maximum discharge pressure of oil that is allowed to be discharged in the fully discharged state. The pressure regulation control unit may set the target hydraulic pressure to a hydraulic pressure between the maximum discharge pressure in the partially discharged state stored in the storage unit and the maximum discharge pressure in the fully discharged state stored in the storage unit.

The switching control unit may perform switching control to switch to the partially discharged state. When the oil pressure detected by the hydraulic pressure detection unit is higher than the maximum discharge pressure in the partially discharged state, the determination unit may determine that the switching unit has a fixation abnormality in the fully discharged state.

The switching unit may have a solenoid valve and a spool valve, and switch between the fully discharged state and the partially discharged state by opening and closing the spool valve by a control pressure supplied from the solenoid valve. The determination unit may determine whether at least one of the solenoid valve or the spool valve has a fixation abnormality.

The hydraulic circuit may be a hydraulic circuit mounted on a vehicle that uses an engine as a drive source. The oil pump may have a maximum discharge pressure characteristic indicating the maximum discharge pressure in the fully discharged state, which varies according to a number of engine revolutions, and a maximum discharge pressure characteristic indicating the maximum discharge pressure in the partially discharged state, which varies according to the number of engine revolutions. The storage unit may store the maximum discharge pressure characteristic in the fully discharged state, which varies according to the number of engine revolutions, and the maximum discharge pressure characteristic in the partially discharged state, which varies according to the number of engine revolutions.

The oil pump may have a maximum discharge pressure characteristic indicating the maximum discharge pressure in the fully discharged state, which varies according to a temperature of oil, and a maximum discharge pressure characteristic indicating the maximum discharge pressure in the partially discharged state, which varies according to the temperature of oil. The storage unit may store the maximum discharge pressure characteristic in the fully discharged state, which varies according to the temperature of oil, and the maximum discharge pressure characteristic in the partially discharged state, which varies according to the temperature of oil.

The hydraulic circuit may be a hydraulic circuit of an automatic transmission mounted on a vehicle. When a transmission gear ratio of the automatic transmission indicates a transmission gear ratio on an overdrive side, the pressure regulation control unit may perform pressure regulation control.

Another aspect of the present invention provides an abnormality detection method for a hydraulic circuit comprising an oil pump that increases a pressure of oil sucked through a suction port and discharges the oil through discharge ports; a switching unit that switches between a fully discharged state where oil is discharged to an oil passage through all the discharge ports and a partially discharged state where oil is discharged to the oil passage through part of the discharge ports; a pressure regulation unit that regulates a pressure of oil discharged in one of the discharged states, switched by the switching unit; and a hydraulic pressure detection unit that detects the hydraulic pressure regulated by the pressure regulation unit. The abnormality detection method includes: performing switching control to switch to either one of the fully discharged state and the partially discharged state by the switching unit; after the switching control in the performing of the switching control, setting a target hydraulic pressure to a hydraulic pressure higher than the maximum discharge pressure in the partially discharged state stored in the storage unit, and performing pressure regulation control on the pressure regulation unit to achieve the target hydraulic pressure; and after the pressure regulation control in the performing the pressure regulation control, determining whether the switching unit has a fixation abnormality in the fully discharged state or the partially discharged state by comparing the hydraulic pressure detected by the hydraulic pressure detection unit with the maximum discharge pressure in the partially discharged state.

In the performing of the pressure regulation control, the target hydraulic pressure may be set to a hydraulic pressure between the maximum discharge pressure in the partially discharged state stored in the storage unit and the maximum discharge pressure in the fully discharged state stored in the storage unit.

In the performing of the switching control, switching control to switch to the partially discharged state may be performed. When the oil pressure detected by the hydraulic pressure detection unit is higher than the maximum discharge pressure in the partially discharged state, the determining may determine that the switching unit has a fixation abnormality in the fully discharged state.

BRIEF DESCRIPTION OP THE DRAWINGS

FIG. 5 is a flowchart illustrating the flow of abnormality detection processing according to the implementation.

DETAILED DESCRIPTION

Figure 1:
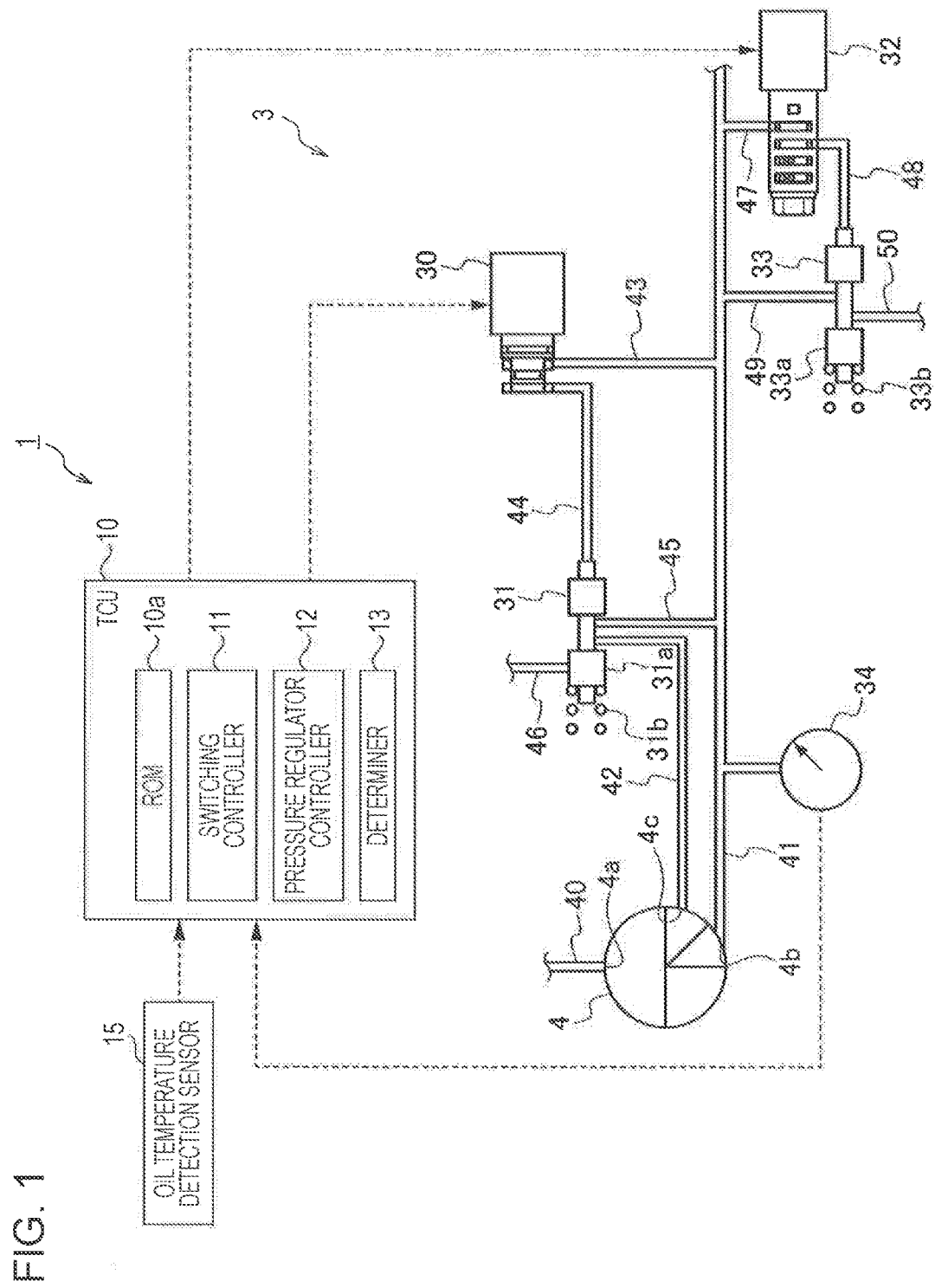
FIG. 1 is a diagram schematically illustrating the configuration of an abnormality detection device and a hydraulic circuit according to an implementation.

Hereinafter, a preferred implementation according to an aspect of the present invention will be described in detail with reference to the drawings. It is to be noted that the same symbol is used for the same or equivalent portions in the drawings. In addition, the same elements are labeled with the same symbol in each drawing and a redundant description is omitted.

The implementation is applied to an abnormality detection device that detects abnormality of a hydraulic circuit of a chain-type CVT mounted on a vehicle. In a hydraulic circuit according to the implementation, an oil pump has two discharge ports and the operating state of the oil pump is switched between a fully discharged state where oil is discharged through the two discharge ports, and a partially discharged state where oil is discharged through one discharge port, and a discharge pressure discharged in either one of the discharged states is regulated to a predetermined line pressure. In one implementation, the predetermined line pressure may serve as a "hydraulic pressure". Since a state where oil is discharged through one of two discharge ports is referred to as a partially discharged state in the implementation, the partially discharged state is called "half discharged state".

Figure 2:
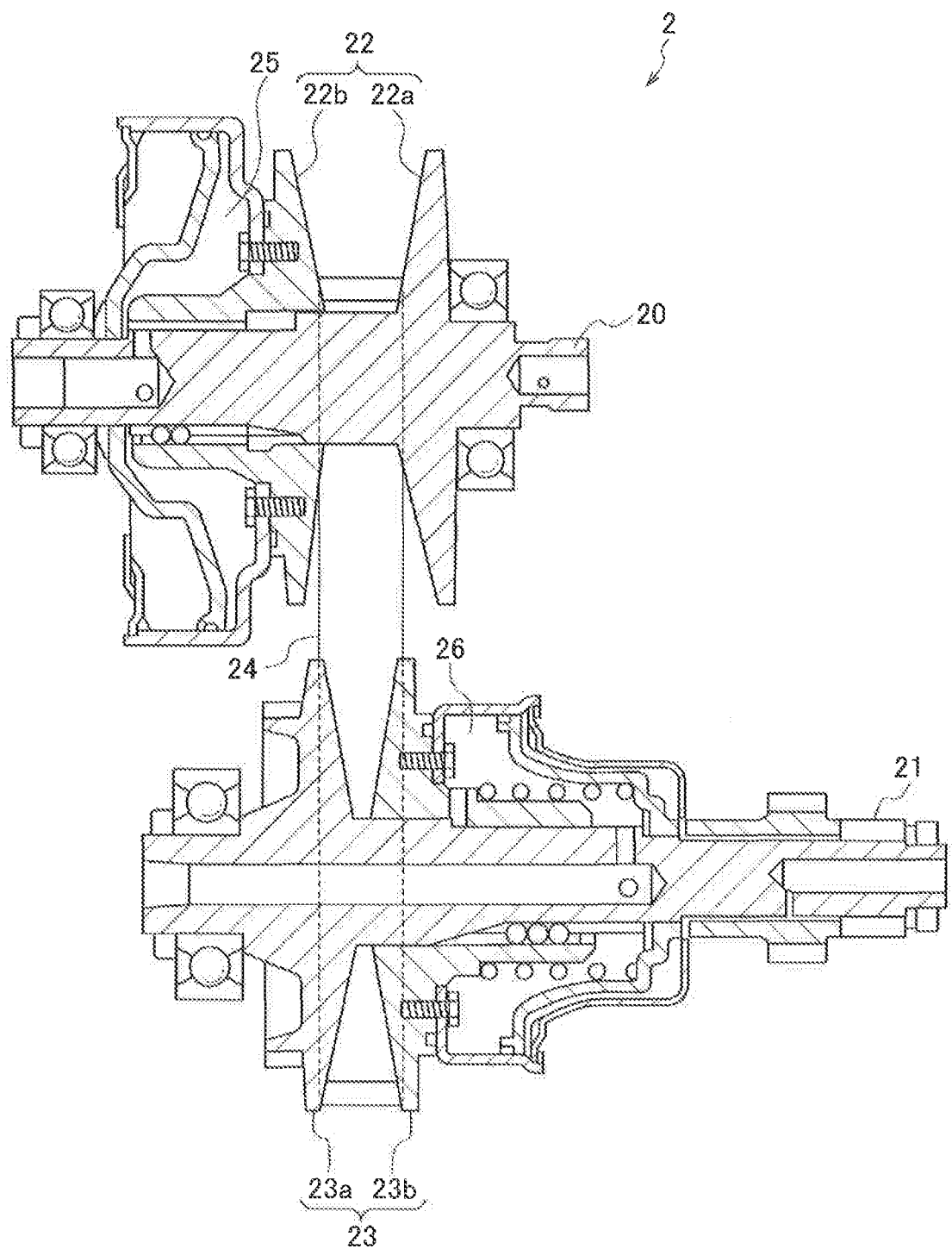
FIG. 2 is a sectional view illustrating the configuration of a CVT which uses the abnormality detection device according to the implementation.

An abnormality detection device 1 for a hydraulic circuit according to the implementation will be described with reference to FIG. 1 and FIG. 2. FIG. 1 is a diagram schematically illustrating the configuration of the abnormality detection device and the hydraulic circuit according to the implementation. FIG. 2 is a sectional view illustrating the configuration of a CVT that uses the abnormality detection device according to the implementation.

A CVT 2 and a hydraulic circuit 3 will be described before the abnormality detection device 1 is described. First, the CVT 2 will be described. The CVT 2 is coupled to the crankshaft of an engine (not illustrated) via, for instance, a torque converter (not illustrated), and converts and outputs the driving force from the engine. The CVT 2 has a primary axis (input axis) 20 coupled to the output axis of the torque converter, and a secondary axis (output axis) 21 disposed in parallel to the primary axis 20.

The primary axis 20 is provided with a primary pulley 22. The primary pulley 22 has a fixed pulley 22a and a movable pulley 22b. The fixed pulley 22a is bonded to the primary axis 20. The movable pulley 22b faces the fixed pulley 22a and is mounted slidably in the axial direction of the primary axis 20 preventing rotation relative to the primary axis 20. The primary pulley 22 is configured to provide a changeable cone surface interval (in other words, a pulley groove width) between the fixed pulley 22a and the movable pulley 22b.

The secondary axis 21 is provided with a secondary pulley 23. The secondary pulley 23 has a fixed pulley 23a and a movable pulley 23b. The fixed pulley 23a is bonded to the secondary axis 21. The movable pulley 23b faces the fixed pulley 23a and is mounted slidably in the axial direction of the secondary axis 21 preventing rotation relative to the secondary axis 21. The secondary pulley 23 is configured to provide a changeable pulley groove width between the fixed pulley 23a and the movable pulley 23b.

A chain 24, which transmits a driving force, is stretched between the primary pulley 22 and the secondary pulley 23. The CVT 2 changes the pulley groove widths of the primary pulley 22 and the secondary pulley 23, then changes a ratio (pulley ratio) of a winding diameter of the chain 24 with respect, to each pulley 22, 23, thereby varying the transmission gear ratio continuously. It is to be noted that the transmission gear ratio i is expressed by i=Rs/Rp, where Rp is the winding radius of the chain 24 to the primary pulley 22 and Rs is the winding radius of the chain 24 to the secondary pulley 23.

A primary driving hydraulic pressure chamber (hydraulic pressure cylinder chamber) 25 is formed in the movable pulley 22b of the primary pulley 22. A secondary driving hydraulic pressure chamber (hydraulic pressure cylinder chamber) 26 is formed in the movable pulley 23b of the secondary pulley 23. A transmission pressure for changing the pulley ratio and a pulley pressure (clamping pressure) for protecting the chain 24 from sliding are introduced to the primary driving hydraulic pressure chamber 25. A pulley pressure (the same pulley pressure as the pulley pressure introduced to the primary driving hydraulic pressure chamber 25) is introduced to the secondary driving hydraulic pressure chamber 26. The pulley pressure and the transmission pressure are introduced by regulating a line pressure generated by the hydraulic circuit 3.

The hydraulic circuit 3 will be described. Oil is supplied to the hydraulic circuit 3 from an oil pump 4. In the hydraulic circuit 3, the discharged state of oil discharged from the oil pump 4 is switched to either one of a fully discharged state and a half discharged state. In addition, in the hydraulic circuit 3, the discharge pressure of the oil discharged in either one of the discharged states is regulated to a line pressure. The hydraulic circuit 3 is a partial hydraulic circuit included in a valve body. A control valve mechanism is incorporated in the valve body (the hydraulic circuit 3). The control valve mechanism opens and closes an oil passage formed in the valve body using multiple spool valves and solenoid valves (electromagnetic valves) to cause the spool valves to move, thereby changing the hydraulic pressure. It is to be noted that the valve body includes, in addition to the hydraulic circuit 3, for instance, a hydraulic circuit that supplies a pulley pressure to the primary driving hydraulic pressure chamber 25 and the secondary driving hydraulic pressure chamber 26 using the line pressure generated by the hydraulic circuit 3, a hydraulic circuit that supplies a transmission pressure to the primary driving hydraulic pressure chamber 25, and a hydraulic circuit that supplies a hydraulic pressure to a forward and reverse switching mechanism that switches between forward/reverse of a vehicle.

The oil pump 4 is driven by the engine power and sucks the oil collected in an oil pan (not illustrated), then discharges high pressure oil with increased pressure to the hydraulic circuit 3. The oil pump 4 is, for instance, a trochoid pump. The oil pump 4 has one suction port 4a and two discharge ports (a first discharge port 4b, a second discharge port 4c). The suction port 4a is coupled to an oil passage 40 which communicates with the oil pan. The first discharge port 4b is coupled to an oil passage 41 for line pressure. The second discharge port 4c is coupled to an oil passage 42 which communicates with a switching valve 31.

The hydraulic circuit 3 has a switching solenoid valve 30, a switching valve 31, a line pressure solenoid valve 32, a line pressure valve 33, and a line pressure detection sensor 34. In one implementation, the switching solenoid valve 30 may serve as a "solenoid valve (switching unit)", the switching valve 31 may serve as a "spool valve (switching unit)", the line pressure solenoid valve 32 may serve as a "pressure regulation unit", the line pressure valve 33 may serve as a "pressure regulation unit", and the line pressure detection sensor 34 may serve as a "corresponding to the hydraulic pressure detection unit".

In the hydraulic circuit 3, the discharged state of the oil pump 4 is switched between a fully discharged state and a half discharged state by the switching solenoid valve 30 and the switching valve 31 on which switching control is performed by a transmission control unit (TCU) 10 described later.

The switching solenoid valve 30 is an on/off solenoid valve. The switching solenoid valve 30 is coupled to the oil passage 43 which communicates with the oil passage 41 and the oil passage 44 which communicates with the switching valve 31. The switching solenoid valve 30 is coupled to the TCU 10. The switching solenoid valve 30 is turned on when a predetermined current is supplied from the TCU 10, and is turned off when the current supply is stopped. The switching solenoid valve 30, when turned on, generates a switching control pressure using the oil supplied via the oil passage 43, and supplies the switching control pressure to the switching valve 31 via the oil passage 44. The switching solenoid valve 30, when turned off stops the supply of the switching control pressure to the switching valve 31.

The switching valve 31 is a spool valve, and has a spool 31a that slides in the axial direction, and a spring 31b disposed at one end side of the spool 31a. The switching valve 31 is coupled to the oil passage 42 which communicates with the oil pump 4, the oil passage 44 which communicates with the switching solenoid valve 30, an oil passage 45 which communicates with the oil passage 41, and an oil passage 46 for discharging oil. The driving (position) of the switching valve 31 in the axial direction of the spool 31a is controlled according to whether a switching control pressure is supplied from the switching solenoid valve 30. Specifically, in the switching valve 31, the spool 31a is driven in the axial direction according to the balance between the pushing force (switching control pressure× pressure receiving area) by the switching control pressure supplied via the oil passage 44 (however, supply of she switching control pressure is stopped when the switching solenoid valve 30 is OFF), and the spring force (urging force) of the spring 31b.

When a switching control pressure is supplied from the switching solenoid valve 30, the spool 31a of the switching valve 31 is moved so that the oil passage 42 communicates with the oil passage 46. In this case, the oil, which is discharged to the oil passage 42 through the second discharge port 4c of the oil pump 4, is discharged via the oil passage 46, and a half discharged state is achieved where oil is discharged to the oil passage 41 only through the first discharge port 4b of the oil pump 4. Thus, the load of the oil pump 4 is reduced, and the fuel efficiency of the vehicle is improved. On the other hand, when the supply of the switching control pressure from the switching solenoid valve 30 is stopped, the spool 31a is moved so that the oil passage 42 communicates with the oil passage 45. In this case, the oil, which is discharged to the oil passage 42 through the second discharge pore 4c of the oil pump 4, merges with the oil passage 41 via the oil passage 45, and a fully discharged state is achieved where oil is discharged to the oil passage 41 through the first discharge port 4b and the second discharge port 4c of she oil pump 4. In the case of a fully discharged state, oil is discharged in a greater quantity than in a half discharged state, and thus the discharge pressure can be made higher than in a half discharged state.

In the hydraulic circuit 3, the discharge pressure (the hydraulic pressure in a fully discharged state or the hydraulic pressure in a half discharged state) of oil discharged in either one of the discharged states (a fully discharged states or a half discharged state) is regulated to a predetermined line pressure by the line pressure solenoid valve 32 and the line pressure valve 33 on which pressure regulation control is performed by the TCU 10. The configuration of the line pressure solenoid valve 32 and the line pressure valve 33 enables the line pressure to be regulated with high accuracy.

The line pressure solenoid valve 32 is a linear solenoid valve. The line pressure solenoid valve 32 is coupled to an oil passage 47 which communicates with the oil passage 41 and an oil passage 48 which communicates with the line pressure valve 33. The line pressure solenoid valve 32 is coupled to the TCU 10. The driving (position) of the line pressure solenoid valve 32 in the axial direction of a plunger is controlled according to the value of a current supplied from the TCU 10, and the line pressure control pressure is changed. The line pressure solenoid valve 32 supplies the line pressure control pressure to the line pressure valve 33 via the oil passage 48.

The line pressure valve 33 is a spool valve, and has a spool 33a that slices in the axial direction, and a spring 33b disposed at one end side of the spool 33a. The line pressure valve 33 is coupled to the oil passage 48 which communicates with the line pressure solenoid valve 32, an oil passage 49 which communicates with the oil passage 41, and an oil passage 50 for discharging oil. The driving (position) of the line pressure valve 33 in the axial direction of the spool 33a is controlled according to a line pressure control pressure supplied from the line pressure solenoid valve 32. Specifically, in the line pressure valve 33, the spool 33a is driven in the axial direction according to the balance between the pushing force (line pressure control pressure/pressure receiving area) by the line pressure control pressure supplied via the oil passage 48 and the spring force (urging force) of the spring 33b, and thus the amount of oil discharged via the oil passage 50 is adjusted and the line pressure is regulated. Oil with the regulated line pressure flows through the oil passage 41.

The line pressure detection sensor 34 is a sensor that detects a line pressure. The line pressure detection sensor 34 is coupled to the oil passage 41. The line pressure detection sensor 34 is coupled to the TCU 10. The line pressure detected by the line pressure detection sensor 34 is outputted to the TCU 10.

Figure 3:
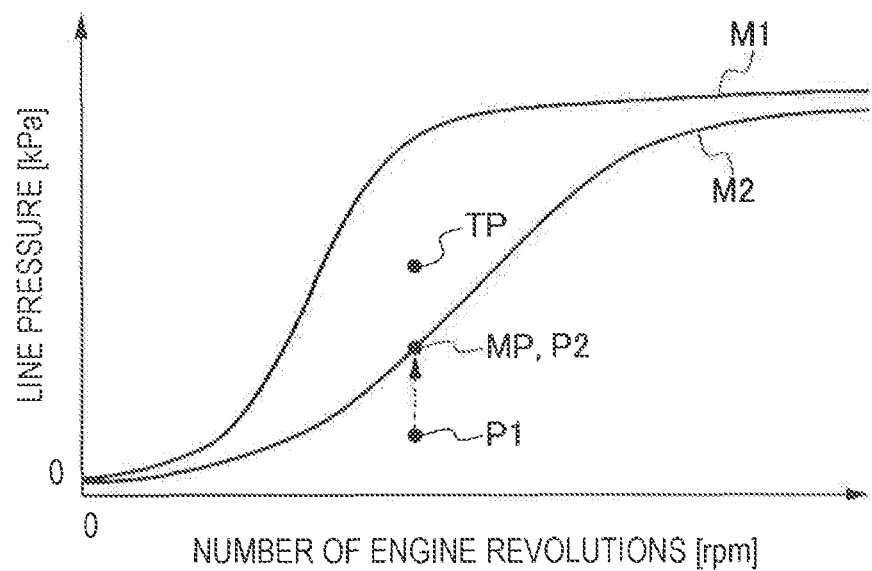
FIG. 3 is a graph illustrating the relationship between a target line pressure and a line pressure (detected value) when determination of normality is made by the abnormality detection device according to the implementation.
Figure 4:
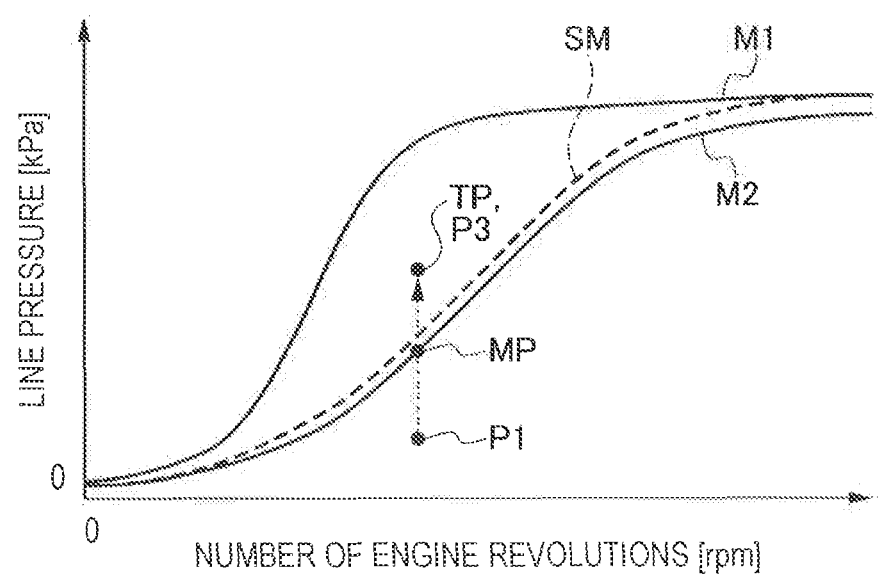
FIG. 4 is a graph illustrating the relationship between a target line pressure and a line pressure (detected value) when determination of a fixation abnormality in a fully discharged state is made by the abnormality detection device according to the implementation.

Next, the abnormality detection device 1 will be described. Here, the abnormality detection device 1 is described with reference to FIG. 3 and FIG. 4 in addition to FIG. 1 and FIG. 2. FIG. 3 is a graph illustrating the relationship between a target line pressure and a line pressure (detected value) when determination of normality is made by the abnormality detection device according to the implementation. FIG. 4 is a graph illustrating the relationship between a target line pressure and a line pressure (detected value) when determination of a fixation abnormality in a fully discharged state is made by the abnormality detection device according to the implementation.

The abnormality detection device 1 is a device that detects abnormality of the hydraulic circuit 3. In particular, the abnormality detection device 1 determines whether the switching solenoid valve 30 and/or the switching valve 31 to switch a discharged state have a fixation abnormality in a fully discharged state. Abnormality detection processing of the abnormality detection device 1 is performed as a function of the TCU 10. It is to be noted that when the switching solenoid valve 30 has a fixation abnormality, the fixation abnormality in a fully discharged state indicates abnormality in which the switching solenoid valve 30 is fixed to the OFF side, whereas when the switching valve 31 has a fixation abnormality, the fixation abnormality in a fully discharged state indicates abnormality in which the spool 31a is fixed to the side where the oil passage 42 communicates with the oil passage 45 (eventually, communicates with the oil passage 41 of the line pressure).

It is to be noted that when the switching solenoid valve 30 and/or the switching valve 31 are fixed in a fully discharged state, the oil passage 42 and the oil passage 45 communicates with each other at all times. Therefore, even when switching control to set to a half discharged state is attempted, the oil passage 42 does not communicate with the oil passage 46. In this case, since a fully discharged state is not switched to a half discharged state even when the switching control to a half discharged state is attempted, it is possible to regulate the pressure up to a hydraulic pressure which exceeds a maximum discharge pressure in a half discharged state. Thus, in the abnormality detection processing, after the switching control to a half discharged state is performed, pressure regulation control is performed so that a target line pressure is temporarily higher than the maximum discharge pressure in a half discharged state, then whether a fixation abnormality in a fully discharged state has occurred is determined by comparing the line pressure (detected value) with the maximum discharge pressure in a half discharged state.

The TCU 10 includes a microprocessor that performs calculations, a ROM 10a that stores programs for causing the microprocessor to execute processing, a RAM that stores various data such as calculation results, a backup RAM with the memory content held by a battery, and an input and output I/F. In one implementation, the ROM 10a may serve as a "storage unit".

The TCU 10 is coupled to various sensors including the line pressure detection sensor 34, and an oil temperature detection sensor 15 that detects a temperature (oil temperature) of oil (for instance, oil flowing through the oil passage 41). The TCU 10 is coupled to solenoids including the switching solenoid valve 30, and the line pressure solenoid valve 32. In addition, the TCU 10 receives information such as an accelerator pedal opening, the number of engine revolutions from an engine control unit (ECU) that comprehensively controls the engine, via a controller area network (CAN).

The TCU 10 performs control to continuously change the transmission gear ratio automatically in accordance with a transmission map according to an operating state (for instance, an accelerator pedal opening, a vehicle speed) of the vehicle. The transmission map is stored in the ROM 10a in the TCU 10. In this process, the TCU 10 performs the following control on the solenoids 30, 32 of the hydraulic circuit 3. The TCU 10 determines whether the discharged state of the oil pump 4 is set to a fully discharged state or a half discharged state according to an operating state of the vehicle. In the case of a half discharged state, a predetermined current is supplied to the switching solenoid valve 30, and in the case of a fully discharged state, the current supply is stopped. The TCU 10 sets a target line pressure which is a specified value of the line pressure when pressure regulation control is performed, and supplies a current needed for achieving a target line pressure to the line pressure solenoid valve 32.

It is to be noted that the oil pump 4 has a maximum discharge pressure characteristic indicating a maximum discharge pressure that is allowed to be discharged in a fully discharged state, and a maximum discharge pressure characteristic indicating a maximum discharge pressure that is allowed to be discharged in a half discharged state. Each of the maximum discharge pressure characteristics is a characteristic that indicates a maximum discharge pressure that varies according to parameters such as the number of engine revolutions and the temperature of oil (oil temperature). For instance, in the case of the number of engine revolutions, the maximum discharge pressure characteristic is such a characteristic that the maximum discharge pressure increases as the number of engine revolutions increases. In the case of the oil temperature, the maximum discharge pressure characteristic is such a characteristic that the maximum discharge pressure decreases as the oil temperature increases. When the maximum discharge pressure characteristic in a fully discharged state is compared with the maximum discharge pressure characteristic in a half discharged state, the maximum discharge pressure in a fully discharged state is higher than the maximum discharge pressure in a half discharged state in the whole region of the number of engine revolutions and the oil temperature.

The instance illustrated in FIG. 3, FIG. 4 indicates a maximum discharge pressure characteristic (map M1) which varies according to the number of engine revolutions in a fully discharged state, and a maximum discharge pressure characteristic (map M2) which varies according to the number of engine revolutions in a half discharged state. In the following, a description is given using the maximum discharge pressure characteristics (two-dimensional snaps M1, M2) which vary according to the number of engine revolutions.

In the ROM 10a of the TCU 10, the maps M1, M2 are stored that indicate two maximum discharge pressure characteristics in a fully discharged state and a half discharged state, respectively. In the case of a fully discharged state, the target line pressure set by the TCU 10 described above is a hydraulic pressure lower than or equal to a maximum discharge pressure in a fully discharged state according to the number of engine revolutions in the map M1, whereas in the case of a half discharged state, the target line pressure is a hydraulic pressure lower than or equal to a maximum discharge pressure in a half discharged state according to the number of engine revolutions in the map M2.

In particular, the TCU 10 has a function of detecting abnormality of the hydraulic circuit 3 described above. To achieve the function, the TCU 10 has a switching controller 11, a pressure regulator controller 12, and a determiner 13. The TCU 10 achieves the functions of the switching controller 11, the pressure regulator control unit 12, and the determiner 13 by executing relevant programs stored in the ROM 10a by the microprocessor. In one implementation, the switching controller 11 may serve as a "switching control unit", the pressure regulator controller 12 may serve as a "pressure regulator control unit", and the determiner 13 may serve as a "determination unit".

The switching controller 11 performs switching control to set the discharged state of the oil pump 4 to a half discharged state. Specifically, the switching controller 11 supplies a predetermined current needed for turning on the switching solenoid valve 30 to the switching solenoid valve 30.

The pressure regulator controller 12 sets a target line pressure higher than the maximum discharge pressure indicated by the maximum discharge pressure characteristic in a half discharged state after switching control to a half discharged state, and performs pressure regulation control to achieve the target line pressure. Specifically, after switching control to a half discharged state is performed by the switching controller 11, the pressure regulator controller 12 extracts a maximum discharge pressure in a fully discharged state according to the number of engine revolutions from the map M1, and extracts a maximum discharge pressure in a half discharged state according to the number of engine revolutions from the map M2. The pressure regulator controller 12 sets the target line pressure to a predetermined hydraulic pressure (a hydraulic pressure sufficiently higher than the maximum discharge pressure in a half discharged state) between the maximum discharge pressure in a fully discharged state and the maximum discharge pressure in a half discharged state. The pressure regulator controller 12 supplies a current needed for achieving the target line pressure to the line pressure solenoid valve 32.

In the case of the instance illustrated in FIG. 3, the hydraulic pressure indicated by symbol P1 is the actual line pressure before pressure regulation control, and the hydraulic pressure indicated by symbol MP is the maximum discharge pressure in a half discharged state according to the number of engine revolutions extracted from the map M2. In the case of the instance, the pressure regulator controller 12 sets a target line pressure TP which is sufficiently higher than the maximum discharge pressure MP in a half discharged state.

After the pressure regulation control, the determiner 13 determines whether the switching solenoid valve 30 and/or the switching valve 31 have a fixation abnormality in a fully discharged state. Specifically, after the pressure regulation control is performed by the pressure regulator controller 12 using the target line pressure higher than the maximum discharge pressure in a half discharged state, the determiner 13 determines whether the line pressure detected by the line pressure detection sensor 34 is higher than the maximum discharge pressure in a half discharged state. When the line pressure (detected value) is higher than the maximum discharge pressure in a half discharged state (when the line pressure (detected value) is approximately equal to the target line pressure), the determiner 13 determines that the switching solenoid valve 30 and/or the switching valve 31 have a fixation abnormality in a fully discharged state. On the other hand, when the line pressure (detected value) is not higher than the maximum discharge pressure in a half discharged state (when the line pressure (detected value) is approximately equal to the maximum discharge pressure in a half discharged state and the line pressure (detected value) is away from the target line pressure), the determiner 13 makes determination of normality.

In the determination of the determiner 13, for instance, a map SM for threshold value indicated in FIG. 4 is utilized, and a threshold value (a hydraulic pressure slightly higher than the maximum discharge pressure of in a half discharged state) according to the number of engine revolutions is set based on the map SM, then whether the line pressure is higher than or equal to the threshold value is determined. The map SM is a map having a hydraulic pressure higher by a predetermined amount than the maximum discharge pressure indicated by the map M2 that varies according to the number of engine revolutions. The predetermined amount may be, for instance, a fixed amount, or an amount that increases gradually as the number of engine revolutions increases as illustrated in FIG. 4.

In the case of the instance illustrated in FIG. 3, a hydraulic pressure P2 is the line pressure detected by the line pressure detection sensor 34 after the pressure regulation control. The line pressure (detected value) P2 is approximately equal to the maximum discharge pressure MP in a half discharged state. Thus, the line pressure (detected value) P2 is limited by the maximum discharge pressure MP in a half discharged state regardless of the pressure regulation control using the target line pressure TP higher than the maximum discharge pressure MP in a half discharged state. Therefore, switching to a half discharged state is performed normally. In this case, the determiner 13 makes determination of normality.

In the case of the instance illustrated in FIG. 4, a hydraulic pressure P3 is the line pressure detected by the line pressure detection sensor 34 after the pressure regulation control. The line pressure (detected value) P3 is approximately equal to the target line pressure TP higher than the maximum discharge pressure MP in a half discharged state. Thus, the line pressure (detected value) P3 exceeds the maximum discharge pressure MP in a half discharged state regardless of the switching control to a half discharged state. Therefore, switching to a half discharged state is not performed normally (in other words, the discharged state is still in a fully discharged state). In this case, the determiner 13 determines that the switching solenoid valve 30 and/or the switching valve 31 have a fixation abnormality in a fully discharged state.

Although the determiner 13 determines whether a fixation abnormality in a fully discharged state has occurred based on whether the line pressure (detected value) is higher than the maximum discharge pressure in a half discharged state, the determiner 13 makes the determination on the basis of whether the line pressure (detected value) is approximately equal to the maximum discharge pressure in a half discharged state. In the case of the determination, when the line pressure (detected value) is approximately equal to the maximum discharge pressure in a half discharged state, determination of normality is made, whereas when the line pressure (detected value) is not approximately equal to the maximum discharge pressure in a half discharged state, determination of a fixation abnormality in a fully discharged state is made.

Like this, in the abnormality detection processing, after the switching control to a half discharged state is performed, pressure regulation control is performed so that the target line pressure is temporarily higher than the maximum discharge pressure in a half discharged state. Therefore, when a fixation in a fully discharged state occurs, the line pressure is temporarily increased more than the maximum discharge pressure in a half discharged state. In order to reduce the effect on drivability by the temporarily increased line pressure, it is preferable to perform the abnormality detection processing when a predetermined condition is met. The predetermined condition is the case where the transmission gear ratio of the CVT 2 is a transmission gear ratio on the overdrive side, for instance. Also, in order to set an appropriate target line pressure, the abnormality detection processing is preferably performed when there is a large hydraulic pressure difference between the maximum discharge pressure in a fully discharged state in the map M1 and the maximum discharge pressure in a half discharged state in the map M2.

When the TCU 10 determines that the switching solenoid valve 30 and/or the switching valve 31 have a fixation abnormality in a fully discharged state, in order to notify a driver of the abnormality, it is better to display a message for notifying of abnormality on an in-vehicle display, to output a voice message for notifying of abnormality, or to light a warning light. Alternatively, it is better to record information (for instance, a diagnosis code) on the TCU 10, the information indicating a fixation abnormality in a fully discharged state.

The operation of the abnormality detection device 1 will be described based on the flowchart of FIG. 5 with reference to FIG. 1. FIG. 5 is a flowchart illustrating the flow of abnormality detection processing according to the implementation. The processing is performed, for instance, when the above-described predetermined condition is met.

The TCU 10 supplies a predetermined current needed for turning on the switching solenoid valve 30 to the switching solenoid valve 30 (step 310). Upon being supplied with a predetermined current, the switching solenoid valve 30, when normal, is turned on to generate a switching control pressure, and supplies the switching control pressure to the switching valve 31 via the oil passage 44. On the other hand, in the case where the switching solenoid valve 30 has a fixation abnormality in a fully discharged state (in other words, in the case of OFF fixation), even when a predetermined current is supplied, the switching solenoid valve 30 is not turned on, and does not supply a switching control pressure to the switching valve 31. In this case, the operating state of the oil pump 4 is a fully discharged state at all times where oil is discharged to the oil passage 41 through the first discharge port 4b and the second discharge port 4c. Upon being supplied with a switching control pressure, the switching valve 31, when normal, allows the spool 31a to move to a position where the oil passage 42 and the oil passage 46 communicate with each other. In this case, the operating state of the oil pump 4 is switched to a half discharged state where oil is discharged to the oil passage 41 only through the first discharge port 4b. On the other hand, in the case where the switching valve 31 has a fixation abnormality in a fully discharged state (in other words, the spool 31a is fixed to the side where the oil passage 42 and the oil passage 45 communicate with each other), even when a switching control pressure is supplied, the spool 31a is not moved to a position where the oil passage 42 and the oil passage 46 communicate with each other. In this case, the operating state of the oil pump 4 is a fully discharged state at all times.

The TCU 10 utilizes the maps M1, M2 to set a target line pressure higher than the maximum discharge pressure in a half discharged state according to the number of engine revolutions (step S12). The TCU 10 then supplies a current needed for achieving the target line pressure to the line pressure solenoid valve 32 (step S14). The line pressure solenoid valve 32 generates a line pressure control pressure according to the supplied current, and supplies the line pressure control pressure to the line pressure valve 33 via the oil passage 48. In the line pressure valve 33, the spool 33a is moved according to the supplied line pressure control pressure, oil is discharged via the oil passage 50 according to the position of the spool 33a, and the line pressure is regulated to achieve the target line pressure.

In this process, when the switching solenoid valve 30 is normal and the switching valve 31 is normal, the operating state of the oil pump 4 is switched to a half discharged state, and thus the line pressure is limited by the maximum discharge pressure in a half discharged state, and is not increased to the target line pressure. On the other hand, in the case where the switching solenoid valve 30 and/or the switching valve 31 have a fixation abnormality in a fully discharged state, the operating state of the oil pump 4 is not switched to a half discharged state (in other words, still in a fully discharged state), and thus the line pressure is not limited by the maximum discharge pressure in a half discharged state, and is increased to the target line pressure exceeding the maximum discharge pressure.

The TCU 10 determines whether a line pressure detected by the line pressure detection sensor 34 is higher than the maximum discharge pressure in a half discharged state (step S16). In step S16, when it is determined that the line pressure (detected value) is higher than the maximum discharge pressure in a half discharged state, the TCU 10 determines that the switching solenoid valve 30 and/or the switching valve 31 have a fixation abnormality in a fully discharged state (step S18). Now, the processing is completed. On the other hand, in step S16, when it is determined that the line pressure (detected value) is not higher than the maximum discharge pressure in a half discharged state, the switching solenoid valve 30 and the switching valve 31 are normal, and the processing is completed.

After the abnormality detection processing is completed, the TCU 10 sets an appropriate target line pressure lower than or equal to the maximum discharge pressure in a half discharged state, and performs pressure regulation control on the line pressure solenoid valve 32 to achieve the target line pressure.

With the abnormality detection device 1 according to the implementation, in the case where the line pressure (detected value) exceeds the maximum discharge pressure in a half discharged state regardless of the switching control to a half discharged state utilizing the maximum discharge pressure (the maximum discharge pressure characteristic that varies according to the number of engine revolutions or the like) in a half discharged state, it is possible to determine with high accuracy that the switching solenoid valve 30 and/or the switching valve 31 have a fixation abnormality in a fully discharged state. In this process, the abnormality detection device 1 is capable of detecting a fixation abnormality in a fully discharged state by a simple method without setting a predetermined condition on the number of engine revolutions.

The abnormality detection device 1 according to the implementation allows an appropriate target line pressure to be set in a range not exceeding the maximum discharge pressure in a fully discharged state by setting the target line pressure to a predetermined hydraulic pressure between the maximum discharge pressure in a half discharged state and the maximum discharge pressure in a fully discharged state. In addition, the abnormality detection device 1 according to the implementation allows an appropriate target line pressure to be set according to the number of engine revolutions or the like by using the maximum discharge pressure characteristic in a half discharged state, (for instance, the map M2) that varies according to the number of engine revolutions or the like, and the maximum discharge pressure characteristic in a fully discharged state, (for instance, the map M1) that varies according to the number of engine revolutions or the like.

Although the implementation in the invention has been described above, the present disclosure is not limited to the implementation and various modifications may be made. For instance, although the disclosure has been applied to the hydraulic circuit 3 of the chain-type CVT 2 mounted on a vehicle in the implementation, the disclosure is applicable to a belt-type or toroidal-type CVT, other automatic transmissions such as AT or DCT, and a hydraulic circuit of an apparatus other than the automatic transmission. Alternatively, the disclosure is applicable to a hydraulic circuit of an apparatus mounted on other than a vehicle.

Although the switching solenoid valve 30 and the switching valve 31 are used as switching units in the implementation, the switching units are not limited to the configuration in which an on/off solenoid valve and a spool valve are used. Although the line pressure solenoid valve 32 and the line pressure valve 33 are used as pressure regulation units, the pressure regulation units are not limited to the configuration in which a linear solenoid valve and a spool valve are used.

Although the disclosure is applied to the oil pump 4 having two discharge ports 4b, 4c in the implementation, the disclosure is applicable to an oil pump having three or more discharge ports.

In the implementation, a configuration is adopted in which the target line pressure is set to a predetermined hydraulic pressure between the maximum discharge pressure in a fully discharged state and the maximum discharge pressure in a half discharged state by using the maximum discharge pressure characteristic (map M1) in a fully discharged state and the maximum discharge pressure characteristic (map M2) in a half discharged state. However, a target line pressure higher than the maximum discharge pressure in a half discharged state may be set using only the maximum discharge pressure characteristic (map M2) in a half discharged state.

Although a description is given in the implementation using the maximum discharge pressure characteristics (two-dimensional maps M1, M2) which vary according to the number of engine revolutions, a three-dimensional map may be used indicating the maximum discharge pressure characteristic that varies according to the number of engine revolutions and the oil temperature, or a two-dimensional map may be used indicating the maximum discharge pressure characteristic that varies according to the oil temperature, or a four or higher dimensional map may be used in consideration of other parameters affecting on the hydraulic pressure, except the number of engine revolutions and the oil temperature. For instance, when a maximum discharge pressure according to the oil temperature is extracted from a maximum discharge pressure characteristic (map) that varies according to the oil temperature, and a target line pressure is set using the maximum discharge pressure, it is possible to set an appropriate target line pressure according to the oil temperature.

The invention claimed is:

1. An abnormality detection device for a hydraulic circuit comprising an oil pump capable of increasing a pressure of oil sucked through a suction port and discharging the oil through discharge ports; a switching unit that switches between a fully discharged state where oil is discharged to an oil passage through all the discharge ports and a partially discharged state where oil is discharged to the oil passage through part of the discharge ports; a pressure regulation unit that regulates a pressure of oil discharged in either one of the discharged states, switched by the switching unit; and a hydraulic pressure detection unit that detects a hydraulic pressure regulated by the pressure regulation unit, the device comprising:

a storage unit that stores a first maximum discharge pressure of oil that is allowed to be discharged in the partially discharged state;

a switching control unit that performs switching control to switch to either one of the fully discharged state and the partially discharged state by the switching unit;

a pressure regulation control unit that, after the switching control is performed by the switching control unit, sets a target hydraulic pressure to a hydraulic pressure higher than the first maximum discharge pressure in the partially discharged state stored in the storage unit, and performs pressure regulation control on the pressure regulation unit in an effort to achieve the target hydraulic pressure; and a determination unit that, after the pressure regulation control performed by the pressure regulation control unit, determines whether the switching unit has a fixation abnormality in the fully discharged state or the partially discharged state by comparing an oil pressure detected by the hydraulic pressure detection unit with the first maximum discharge pressure in the partially discharged state.

2. The abnormality detection device according to claim 1, wherein the storage unit stores a second maximum discharge pressure of oil that is allowed to be discharged in the fully discharged state, and the pressure regulation control unit sets the target hydraulic pressure to a hydraulic pressure between the first maximum discharge pressure in the partially discharged state stored in the storage unit and the second maximum discharge pressure in the fully discharged state stored in the storage unit.

3. The abnormality detection device according to claim 2, wherein the switching control unit performs switching control to switch to the partially discharged state, and when the oil pressure detected by the hydraulic pressure detection unit is higher than the first maximum discharge pressure in the partially discharged state, the determination unit determines that the switching unit has the fixation abnormality in the fully discharged state.

4. The abnormality detection device according to claim 2, wherein the switching unit has a solenoid valve and a spool valve, and switches between the fully discharged state and the partially discharged state by opening and closing the spool valve by a control pressure supplied from the solenoid valve, and the determination unit determines whether at least one of the solenoid valve or the spool valve has the fixation abnormality.

5. The abnormality detection device according to claim 2, wherein the hydraulic circuit is mounted on a vehicle that uses an engine as a drive source, the oil pump has first discharge pressure characteristic indicating the maximum discharge pressure in the fully discharged state, which varies according to a number of engine revolutions, and a second discharge pressure characteristic indicating the maximum discharge pressure in the partially discharged state, which varies according to the number of engine revolutions, and the storage unit stores the first discharge pressure characteristic in the fully discharged state, which varies according to the number of engine revolutions, and the second discharge pressure characteristic in the partially discharged state, which varies according to the number of engine revolutions.

6. The abnormality detection device according to claim 2, wherein the oil pump has a first discharge pressure characteristic indicating the maximum discharge pressure in the fully discharged state, which varies according to a temperature of oil, and a second discharge pressure characteristic indicating the maximum discharge pressure in the partially discharged state, which varies according to the temperature of oil, and the storage unit stores the first discharge pressure characteristic in the fully discharged state, which varies according to the temperature of oil, and the second discharge pressure characteristic in the partially discharged state, which varies according to the temperature of oil.

7. The abnormality detection device according to claim 2, wherein the hydraulic circuit is in communication with an automatic transmission mounted on a vehicle, and when a transmission gear ratio of the automatic transmission indicates an overdrive side, the pressure regulation control unit performs pressure regulation control.

8. The abnormality detection device according to claim 1, wherein the switching control unit performs switching control to switch to the partially discharged state, and when the oil pressure detected by the hydraulic pressure detection unit is higher than the first maximum discharge pressure in the partially discharged state, the determination unit determines that the switching unit has the fixation abnormality in the fully discharged state.

9. The abnormality detection device according to claim 1, wherein the switching unit has a solenoid valve and a spool valve, and switches between the fully discharged state and the partially discharged state by opening and closing the spool valve by a control pressure supplied from the solenoid valve, and the determination unit determines whether at least one of the solenoid valve or the spool valve has the fixation abnormality.

10. The abnormality detection device according to claim 1, wherein the hydraulic circuit is mounted on a vehicle that uses an engine as a drive source, the oil pump has a first discharge pressure characteristic indicating the maximum discharge pressure in the fully discharged state, which varies according to a number of engine revolutions, and a second discharge pressure characteristic indicating the maximum discharge pressure in the partially discharged state, which varies according to the number of engine revolutions, and the storage unit stores the first discharge pressure characteristic in the fully discharged state, which varies according to the number of engine revolutions, and the second discharge, pressure characteristic in the partially discharged state, which varies according to the number of engine revolutions.

11. The abnormality detection device according to claim 1, wherein the oil pump has a first discharge pressure characteristic indicating the maximum discharge pressure in the fully discharged state, which varies according to a temperature of oil, and a second discharge pressure characteristic indicating the maximum discharge pressure in the partially discharged state, which varies according to the temperature of oil, and the storage unit stores the first discharge pressure characteristic in the fully discharged state, which varies according to the temperature of oil, and the second discharge pressure characteristic in the partially discharged state, which varies according to the temperature of oil.

12. The abnormality detection device according to claim 1, wherein the hydraulic circuit is in communication with an automatic transmission mounted on a vehicle, and when a transmission gear ratio of the automatic transmission indicates an overdrive side, the pressure regulation control unit performs pressure regulation control.

13. An abnormality detection method for a hydraulic circuit comprising an oil pump that increases a pressure of oil sucked through a suction port and discharges the oil through discharge ports; a switching unit that switches between a fully discharged state where oil is discharged to an oil passage through all the discharge ports and a partially discharged state where oil is discharged to the oil passage through part of the discharge ports; a pressure regulation unit that regulates a pressure of oil discharged in one of the discharged states, switched by the switching unit; and a hydraulic pressure detection unit that detects a hydraulic pressure regulated by the pressure regulation unit, the abnormality detection method comprising:
performing switching control to switch to either one of the fully discharged state and the partially discharged state by the switching unit;
after switching control, setting a target hydraulic pressure to a hydraulic pressure higher than a first maximum discharge pressure in the partially discharged state stored in a storage unit, and performing pressure regulation control on the pressure regulation unit in an effort to achieve the target hydraulic pressure; and
after performing the pressure regulation control, determining whether the switching unit has a fixation abnormality in the fully discharged state or the partially discharged state by comparing hydraulic pressure detected by the hydraulic pressure detection unit with the first maximum discharge pressure in the partially discharged state.

14. The abnormality detection method according to claim 13, wherein in the performing of the pressure regulation control, the target hydraulic pressure is set to a value between the first maximum discharge pressure in the partially discharged state stored in the storage unit and a second maximum discharge pressure in the fully discharged state stored in the storage unit.

15. The abnormality detection method according to claim 13, wherein in the performing of the switching control, switching control to switch to the partially discharged state is performed, and when the oil pressure detected by the hydraulic pressure detection unit is higher than the first maximum discharge pressure in the partially discharged state, the determining determines that the switching unit has the fixation abnormality in the fully discharged state.

16. The abnormality detection method according to claim 14, wherein in the performing of the switching control, switching control to switch to the partially discharged state is performed, and when the oil pressure detected by the hydraulic pressure detection unit is higher than the first maximum discharge pressure in the partially discharged state, the determining determines that the switching unit has the fixation abnormality in the fully discharged state.

17. An abnormality detection device for a hydraulic circuit including an oil pump capable of increasing a pressure of oil sucked through a suction port and discharging the oil through discharge ports; a switch that switches between a fully discharged state where oil is discharged to an oil passage through all the discharge ports and a partially discharged state where oil is discharged to the oil passage through part of the discharge ports; a pressure regulator that regulates a pressure of oil discharged in either one of the discharged states, switched by the switch; and a hydraulic pressure detector that detects a hydraulic pressure regulated by the pressure regulator, the device comprising:

a processor; and
a memory that stores one or more programs for causing the processor to execute processing, and stores a first maximum discharge pressure of oil that is allowed to be discharged in the partially discharged state, the processing including:
performing switching control to switch to either one of the fully discharged state and the partially discharged state;
in conjunction with switching control performance, setting a target hydraulic pressure to a hydraulic pressure higher than the first maximum discharge pressure in the partially discharged state, and performing pressure regulation control on the pressure regulator in an effort to achieve the target hydraulic pressure; and
after the pressure regulation control is performed, determining whether the switch has a fixation abnormality in the fully discharged state or the partially discharged state by comparing an oil pressure detected by the hydraulic pressure detector with the first maximum discharge pressure in the partially discharged state.

18. The abnormality detection device according to claim 17, wherein the memory further stores a second maximum discharge pressure of oil that is allowed to be discharged in the fully discharged state, and the processing further includes setting the target hydraulic pressure to a hydraulic pressure between the first maximum discharge pressure in the partially discharged state and the second maximum discharge pressure in the fully discharged state.

19. The abnormality detection device according to claim 17, wherein the performing of the switching control is to switch to the partially discharged state, and when the oil pressure detected by the hydraulic pressure detector is higher than the first maximum discharge pressure in the partially discharged state, the processor executes the processing that includes determining that the switch has the fixation abnormality in the fully discharged state.

20. The abnormality detection device according to claim 17, wherein the switch has a solenoid valve and a spool valve, and switches between the fully discharged state and the partially discharged state by opening and closing the spool valve by control pressure supplied from the solenoid valve, and the processor executes the processing that includes determining whether at least one of the solenoid valve or the spool valve has the fixation abnormality.

* * * * *